US010309646B2

(12) United States Patent
Hockaday et al.

(10) Patent No.: US 10,309,646 B2
(45) Date of Patent: Jun. 4, 2019

(54) MEMBRANE CATALYTIC HEATER

(71) Applicant: GHT GLOBAL HEATING TECHNOLOGIES AG, Baar (CH)

(72) Inventors: Robert G. Hockaday, Los Alamos, NM (US); Patrick S. Turner, Los Alamos, NM (US); Zachary R. Bradford, Los Alamos, NM (US); Marc D. DeJohn, Santa Fe, NM (US); Carlos J. Navas, Santa Fe, NM (US); Heathcliff L. Vaz, Santa Fe, NM (US)

(73) Assignee: GHT GLOBAL HEATING TECHNOLOGIES AG, Baar (CH)

( * ) Notice: Subject to any disclaimer, the term of this patent is extended or adjusted under 35 U.S.C. 154(b) by 316 days.

(21) Appl. No.: 15/269,148

(22) Filed: Sep. 19, 2016

(65) Prior Publication Data

US 2017/0003020 A1 Jan. 5, 2017

Related U.S. Application Data

(60) Division of application No. 14/082,915, filed on Nov. 18, 2013, now Pat. No. 9,447,964, which is a continuation of application No. 12/661,602, filed on Mar. 19, 2010, now Pat. No. 8,585,396, which is a division of application No. 10/492,018, filed as application No. PCT/US02/32041 on Oct. 9, 2002, now Pat. No. 7,708,553.

(60) Provisional application No. 60/327,310, filed on Oct. 9, 2001.

(51) Int. Cl.
*F23D 14/18* (2006.01)
*F23C 13/00* (2006.01)
*F23C 13/02* (2006.01)
*F23C 13/08* (2006.01)

(52) U.S. Cl.
CPC .............. *F23D 14/18* (2013.01); *F23C 13/00* (2013.01); *F23C 13/02* (2013.01); *F23C 13/08* (2013.01); *F23D 2900/03081* (2013.01); *F23N 2037/12* (2013.01); *F23N 2037/14* (2013.01); *Y02E 20/342* (2013.01)

(58) Field of Classification Search
CPC .......... F23C 13/00; F23C 13/02; F23C 13/08; F23C 2900/99001; F23C 2900/9901; F23D 14/18; F23D 2900/03081; F23D 3/02; F23D 17/002; F23D 99/003; F23N 2037/12; F23N 2037/14; Y02E 20/342
See application file for complete search history.

(56) References Cited

U.S. PATENT DOCUMENTS

| | | | | |
|---|---|---|---|---|
| 6,062,210 A | * | 5/2000 | Welles | F24V 30/00 126/208 |
| 6,138,665 A | * | 10/2000 | Welles | A47G 9/0215 126/204 |
| 6,544,400 B2 | * | 4/2003 | Hockaday | B01D 19/0031 204/252 |

* cited by examiner

*Primary Examiner* — Alfred Basichas
(74) *Attorney, Agent, or Firm* — Jenei LLC

(57) ABSTRACT

A portable catalytic combustion heater, wherein fuel vapor (11) and air (10) are supplied to a catalyst (6) which promotes the flameless combustion of fuel and releases that. The fuel is supplied as a liquid, passes through a selectively permeable membrane (8) such that fuel vapor exits the membrane and is fed to the catalyst (6). Additional features include porous supports and means of enhancing and diminishing the catalytic rate of combustion and controlling the heat output.

33 Claims, 12 Drawing Sheets

MEMBRANE CATALYTIC HEATER

CROSS-REFERENCE TO RELATED APPLICATIONS

The present application is a divisional of Ser. No. 14/082,915, filed Nov. 18, 2013, which is a Continuation of Ser. No. 12/661,602, filed Mar. 19, 2010, and now issued as U.S. Pat. No. 8,585,396, which is a division of Ser. No. 10/492,018 Apr. 8, 2004 and now issued as U.S. Pat. No. 7,708,553, which is a 371 of international PCT/US2002/032041, filed Oct. 9, 2002, which claims benefit from U.S. provisional 60/327,310, filed Oct. 9, 2001, which applications are herein incorporated by reference in their entirety for all purposes.

BACKGROUND OF THE INVENTION

Flameless combustion heaters are well known. They typically work on the principle that an appropriate hydrocarbon-based fuel, when in contact with a suitable catalyst in the presence of air (or oxygen), will undergo combustion and release heat. This heat can then be distributed and used for a variety of purposes.

A variety of patents describe the incorporation of such a device on a garment such as a jacket or a belt for providing heat to the body. They typically describe means of pumping the fuel, preheating the fuel-air mixture (often by ignition), and controlling the feeding of the mixture to a catalytic area and distribution of heat resulting from the reaction. These systems tend to add a lot of complexity and cost to the products to which they are incorporated.

Furthermore, these patents describe heaters which are often based on alkane fuels, preferably propane or butane. These fuels are gases, and as such do not lend themselves to being carried easily in portable applications including garments. When using liquid alcohols as fuels, the fuel-air mixture is preheated and ignited before catalytic combustion occurs. Fuels in this category include methanol, naphtha, and ethanol. It is advantageous to react them in the gas phase with air in the presence of a catalyst. Since alcohols are liquids under operating conditions, one way to achieve this goal is shown in U.S. Pat. No. 6,062,210, which describes means of feeding methanol fuel through pores placed in a feeding tube in close proximity to the catalyst. However, this method is not selective, in that the pores will also allow the passage of other substances, which may happen to be present with the methanol fuel. This method can also allow the passage of liquid fuel to flood the catalyst.

These and other shortcomings are overcome in the invention described herein.

SUMMARY OF THE INVENTION

The invention described herein refers to a portable catalytic heater in which fuel vapor and air (or other means of oxygen supply), are supplied to a catalyst. The catalyst promotes the flameless combustion of the fuel releasing heat. The liquid fuel is supplied through the use of a selectively permeable membrane, such that only the fuel vapors diffuse through the membrane and are fed to the catalyst. The catalyst is placed on a support that allows for the diffusion and mixing of reactants such as a porous fiber felt coated with catalysts. Alternatively, the selectively permeable membrane may support the catalyst. The supply of fuel to the selectively permeable membrane and the exact identity of the membrane serve as a way to regulate the degree of heating provided by the catalytic heater. The selective molecular filtration of the fuel through the membrane keeps the catalytic heater from being contaminated from impurities in the fuel, such as salts. The selective permeability of the membrane to fuels (e.g. methanol), over the product (i.e. water), keeps the liquid fuel reservoir from being contaminated with the product and maintains the fuel concentration and a steady rate of fuel delivery. By containing the fuel behind the selective membrane and using diffusion to deliver the fuel, the rate is dependent upon the concentration of liquid in contact with the fuel membrane rather than the fuel vapor pressure. This makes the delivery of fuel and air to the catalyst less sensitive to temperature.

Another feature of the invention is an additional coating which protects the combustion catalyst from contamination and can enhance the catalytic effects. If the coating has the ability to conduct ions (i.e. protons), it may be used to enhance or lower the catalytic combustion rate through electrochemical processes on the catalysts (removal/addition of hydrogen/proton intermediates to catalytic surface). This may be achieved by inserting two electrodes on either side of the coating and applying a voltage across said coating. The coating also has certain permeability to the fuel and the products of the combustion reaction. It serves the purpose of adhering the catalyst powders to the substrate on which they are supported and can limit the catalytic combustion rate serving as yet another regulating mechanism in our invention. The coating can also have an affinity for the fuel, oxidizer, and products to increase the effectiveness of the fuel. The catalytic heater can be incorporated into a system for various applications. One of the unique features of using a liquid fuel with the selectively permeable membrane in proximity to the catalytic heater is when the fuel reaches its boiling point it removes heat from the catalytic reaction site and subsequently limits the maximum temperature. The vaporized fuel can be condensed in a heat exchanger and deliver the thermal output of the heater efficiently. Different mixtures of fuels or a maximum pressure of the fuel reservoir can be chosen to set the boiling point of the fuel and hence the maximum temperature of the heater. This fuel boiling mechanism along with the back diffusion of carbon dioxide and nitrogen can also be used to keep the fuel homogeneous and self purging. By keeping the fuel homogeneous and not in direct contact with catalysts the heater can easily be purged of fuel contamination by draining the fuel.

Another feature of this invention is the membrane through which the fuel is fed is not prone to failure. Unlike U.S. Pat. No. 6,138,665 where the fuel flows through porous tubes, our invention describes the use of a membrane that works by diffusion. One practical way in which this feature is important is the ability to run a catalytic heater with pure methanol fuel, and no water added.

Yet another feature of this invention, due to the fueling mechanism of using the selectively permeable membrane, is that the catalytic heater is insensitive to orientation. A steady delivery of liquid fuel or gas fuel is needed to maintain contact with the selectively permeable membrane. Bubbles and gas pockets in the fuel will not significantly effect the diffusion of fuel through the selectively permeable membrane as long as the surface of the membrane is wetted by fuel. A wet coating or wicking material could be used to spread liquid fuel uniformly over the surface of the selectively permeable membranes. Increasing the hydraulic pressure will not significantly increase the concentration of a liquid fuel against a selectively permeable membrane. Thus the diffusion rate of fuel will not be changed if the system is inverted causing a low or high hydraulic pressure on the selectively permeable membrane. This invention also does not depend on the use of pumps which add complexity and cost of the heater, to create a fuel oxidizer mixture.

Additional features of this invention are the pressurization of the fuel behind the selectively permeable membrane and its flexibility which enable unique passive controls of the diffusion of fuel and air. Temperature selective diffusion through the membrane can also be used to limit or accelerate the fuel delivery. Also, the flexibility of the polymers and rubber materials used in this) invention permits flexibility in packaging into a wide variety of applications such as apparel, blankets, machinery, dwellings, shipping containers, storage containers, insect attractants, humidifiers, and perfume generators.

PRIOR ART

Weiss U.S. Pat. No. 2,764,969 "Heating Device". This patent describes a catalytic heating system comprising a plurality of tubes which direct the heat generated from the reaction to different parts of the user's body. It does not describe means of using a selectively permeable membrane.

Bals et al. U.S. Pat. No. 5,331,845 "Probe and Method for Detecting Alcohol". This patent describes a probe for measuring the concentration of an alcohol. The probe has a membrane that is permeable for vapors of the alcohol but substantially impermeable for the liquid. It does not teach the application of the system to a catalytic combustion heater.

Welles U.S. Pat. No. 5,901,698 "Mechanically Compliant and Portable Catalytic Heating Device". This patent describes a portable catalytic heater where reactants are uniformly released through porous tubes woven with catalyst-impregnated glass filaments into a sheet-shaped, fabric-like structure enclosed in a Mylar envelope. It does not describe the use of membrane materials that are selectively permeable.

Yates and Yates U.S. Pat. No. 5,928,275 "Body Warmer Belt". This patent describes a heater system in the shape of a belt for warming the user's kidney region. It uses a heating pouch made up of activated charcoal, iron powder, and saltwater and wood fibers. It does not cover means of regulating the amount of heat using permeable membranes, and it does not teach how to turn the device off.

Welles U.S. Pat. No. 6,062,210 "Portable Heat Generating Device". This patent describes a portable catalytic heater where reactants are directed through channels contained within a thin, flexible elastomeric sheet of material. The catalytic heat elements are disposed within said channels. It does not describe the use of membrane materials that are selectively permeable.

Hanada et al. U.S. Pat. No. 6,138,664 "Warming Jacket". This patent describes a catalytic heater incorporated onto a jacket to provide warmth for a user's body. It does not describe the use of selectively permeable membrane materials.

Welles U.S. Pat. No. 6,138,665 "Portable Heat Generating Device". This patent describes a portable catalytic heater where reactants are uniformly released through porous tubes woven with catalyst-impregnated glass filaments into a sheet-shaped, fabric-like structure enclosed in a Mylar envelope. It does not describe the use of selectively permeable membrane materials.

Hanada et al. U.S. Pat. No. 6,206,909 B1 "Portable Warmer Suitable for a Body". This patent describes a portable catalytic heater incorporated onto a belt that is used to warm the user's body. It does not describe the use of selectively permeable membranes.

Trade Names/Materials:
Silicone rubber membranes
Specialty Silicone Products
Corporate Technology Park
3 McCrea Hill Road
Ballston Spa, N.Y. 12020
DAIS polymer electrolyte (DAC589-9.1% solid solution)
DAIS-Analytic Corp.
11552 Prosperous Dr.
Odessa, Fla. 33556
Zylon felt
Toyobo
2-8, Dojima Hama 2-Chome, Kita-ku
Osaka, 530-8230, Japan
Pt/Ru black catalyst on Carbon
Alfa-Aesar
30 Bond Street
Ward Hill, Mass. 01835-8099
Cool Max
DuPont Corporation
1007 Market Street
Wilmington, Del. 19898
Engelhard
Chemical Catalysts Group
554 Engelhard Dr.
Seneca, S.C. 29678
Nafion: Perfluorosulfonic Acid, DuPont Corporation.
Alcohol solutions available through:
Solutions Technology, Inc.,
P.O. Box 171
Mendenhall, Pa. 19357.
Aldrich Chemical Company
P.O.Box 2060
Milwaukee Wis. 53201

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
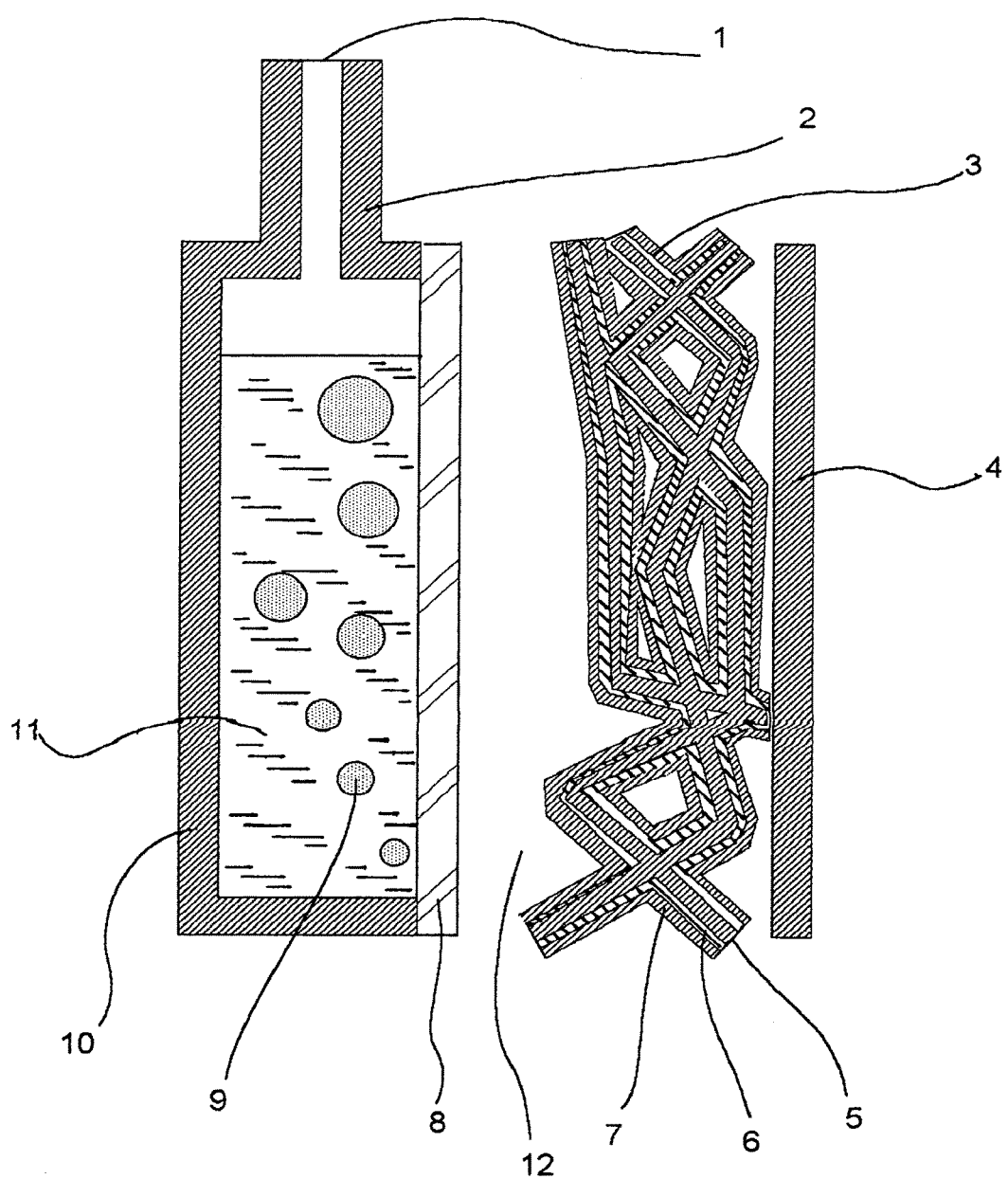
FIG. 1. Cross-sectional view of the fuel tank with membrane and felt supported catalyst.

In FIG. 1 a fuel tank 10 is shown filled with methanol fuel 11. The aluminum tank 10 has a silicone rubber membrane 8 (Specialty Silicone Products, Corporate Technology Park, 3 McCrea Hill Road, Ballston Spa, N.Y. 12020) sealed to the tank wall with 1000% silicone rubber sealant (GE Silicones, Waterford, N.Y. 12188). The methanol fuel 11 preferentially diffuses through the silicone rubber membrane 8 to mix with air 12. Several alternative fuels 11 are formaldehyde, formic acid, 1,3,5-trioxane, di-methyl-ether, acetone and pentane, among others. A felt of polybenzoxazol (PBO), a high temperature high performance fiber 5 (Zylon felt, Toyobo, 2-8, Dojima Hama 2-Chome, Kita-Ku, Osaka, 530-8230, Japan) is coated with Platinum and Ruthenium (Pt/Ru) black catalyst 6 (Alfa-Aesar Alfa-Aesar 30 Bond Street Ward Hill, Mass. 01835-8099). Alternative felts are made of fibers of polybenzimidazole (PBI), polyimides, alumina, fiber glass, zirconia, quartz, p-aramids felts. This catalyst layer is then over-coated with a thin coating 7 such as a solid polymer electrolyte DAIS (DAIS-Analytic Corp., 11552 Prosperous Dr., Odessa, Fla. 33556), Nafion (Solution Technology, Inc., Mendenhall, Pa. 19357) or silicone rubber. The example coatings and materials can be deposited by airbrush spraying a suspension of the catalyst powders. Over-coatings can be deposited by airbrush spraying of a solid polymer electrolyte dissolved in a solvent and dried under air or inert gas. In operation air and fuel diffuse into the coated felt 5 and catalytic combustion occurs on the surface of the catalyst Pt/Ru black. The felt 5 provides a substrate resistant to high temperatures and with a low heat capacity. The catalyst 6 breaks down the methanol and oxidizes it with oxygen from the air. Specific catalysts used are those that can oxidize hydrocarbons and carbon monoxide, which is the last step in the catalytic combustion process. The overcoat 7 on the catalyst serves the purposes of protecting and adhering the catalyst powders and coatings to the felt 5. It also has a high solubility and affinity for the fuel and water so it increases the concentration of the fuel on the catalyst 6. The overcoat 7 also has a high but limited permeability to fuel and oxygen, which limits the rates of catalytic combustion on the catalyst surface and keeps the catalyst from going into high temperature or flame combustion. High temperature combustion can damage the components. The selective permeability of the coating 7 on the catalyst may protect the catalyst by keeping large organic molecules and salts from reaching the surface of the catalyst 6 and limit the presence of products such as water on the catalyst surface, protecting the catalyst surface from environmental contamination. Coatings 7 on the catalysts such as Nafion or DIAS that are electrolytic may enhance the catalytic oxidation. The coating 7 on the surface of the catalyst 6 can also have a permeability that changes with temperature to act as a fuel and oxidizer moderator. As an example, materials such as the solid polymer electrolytes, (e.g. Nafion and DAIS) have lower methanol permeability when they dehydrate with increasing temperature. The catalyzed felt 3 catalytically burns the methanol and air mixture as the oxygen 12 diffuses from the surrounding air and the methanol diffuses through the selectively permeable membrane 8. The selective permeability of the membrane 8 prevents water from diluting the fuel and reducing the fuel delivery rate. It also filters many contaminates that could be in the fuel from reaching the catalysts 6. The selective diffusion through membranes is dominated by the concentration gradient across them and its permeability at particular temperatures. The fuel delivery is therefore independent of the vapor pressure of the fuel when the selective membrane is immersed in fuel. The heat produced by the catalyst felt 3 is conducted into the aluminum fuel tank 10 and into the aluminum cover wall 4. The heat can be conducted and distributed to the application through these surfaces. Heat can also be moved by vaporizing and condensing the fuel such as methanol from the fuel tank 10 to the vent line 2. Fuel 11 such as methanol will condense in the vent line 2 and be returned to the fuel tank 10 by gravity. The carbon dioxide produced in the catalytic burner exhausts through the inlet diffusion route 12 or through the silicone membrane 8. When the heater is running, the temperature can get above the boiling point of the fuel and it will boil. The fuel vapor goes up the vent line 2 and condenses on the walls of the vent line 2. This boiling of the fuel acts to limit the temperature of the heater 3 by heat removal with the vaporized fuel 9. The dissolved carbon dioxide in the fuel is also removed from the fuel by boiling 9 of the fuel 11 and vented 1 out of the vent line 2.

Figure 2:
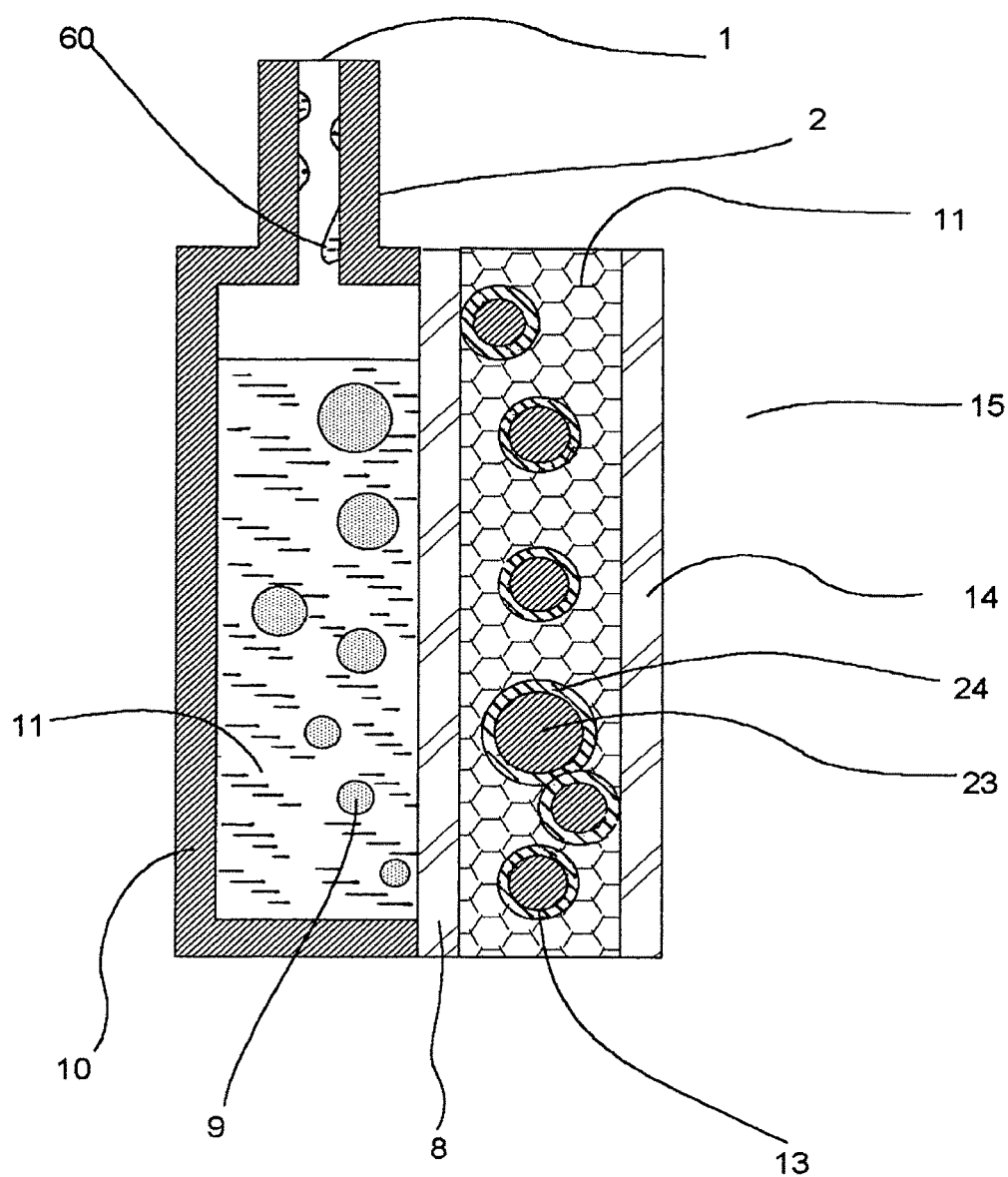
FIG. 2. Cross-sectional view of the fuel tank with membrane and catalyst embalmed in matrix and an outer diffusion membrane.

In FIG. 2, the heater is composed of catalyst particles 13 incorporated into a material such as silicone rubber, Nafion, or DAIS or other selectively permeable embalming material 21. The catalyst particles 13 can consist of a thin film of platinum and ruthenium (Pt/Ru) catalyst or atomic catalyst clusters of platinum (Pt) 23 dispersed over the surface of a high surface area zeolite, alumina, or activated carbon particles 22. In this design the fuel diffuses through the selectively permeable membrane 18, through the embalming material 21 to the catalyst particles 13. Oxygen diffuses from the air 15 through an outer membrane made of silicone rubber or a porous filter to dust and liquid water such as micro-porous polytetrafluro ethylene 14 (DuPont Corporation, 1007 Market Street, Wilmington, Del. 19898), or Nafion: Perfluorosulfonic Acid, (DuPont Corporation). Alcohol solutions of Nafion are available through: Solutions Technology, Inc., P.O. Box 171, Mendenhall, Pa. 19357, Wilmington, Del. Over this outer membrane 14 perfluoropolyalkylene oxides such as polyperfluropropylene oxide or polyperfluoropropylene oxide co-perfluroformaldehyde, (Aldrich Chemical Company. P.O. Box 2060 Milwaukee Wis. 53201) can be coated to give it more selective permeability to oxygen and selectively retain fuel. The oxygen membrane can also be a material or mechanical mechanism that increases or decreases its rate of oxygen diffusion depending on temperature, thus limiting the catalytic combustion. The outer membrane 14 can also be a material or mechanical mechanism that changes its thermal insulation properties so that at low temperatures it is a good insulator and at higher temperatures it is a heat transfer material. A micro-porous material such as expanded polytetrafluoroethylene (PTFE), polybenzimidazole (PBI) felt or perforated polyimide sheet could also be effective in creating a diffusion filter and thermal insulation region 14 between the catalyst 13 and the outside air 15. The oxygen diffuses to the surface of the catalyst particles 13 to react with the fuel on the catalyst 23. The heat generated by the catalytic combustion is conducted into the fuel tank and to the outer surface of the air filter 14. The heat can be delivered to the application through the case 20 (made of aluminum, PVC or stainless steel), the condensation tube 17 or the surface of the air membrane 14. The methanol fuel 21 will boil when it reaches its boiling point and remove heat from the surface of the fuel membrane 18. Water and carbon dioxide produced by combustion at the catalyst 13 will diffuse through the embalming material and the fuel membrane 18 and out through the air membrane 14. The selective permeability of fuel over water of the fuel membrane 18 compared to the air membrane 14 will lead to the water product being blocked from diffusing into the fuel 21 and the dominant water exhaust route being out through the outer membrane 14. The silicone rubber, Nafion and DAIS materials will all have a high permeability to carbon dioxide. A large fraction of the product carbon dioxide will diffuse through the fuel membrane 18 and into the fuel 21. Along with the heat removal by boiling the fuel 19 and condensing 78 on the outlet tubes 17, carbon dioxide is vented 16 from the fuel with the boiling methanol 19. The condensed methanol 78 in the outlet tube 17 is returned to the fuel tank via gravitational pull. This device just described with the addition of a fueling scheme could be used as a pocket heater in apparel.

Figure 3:
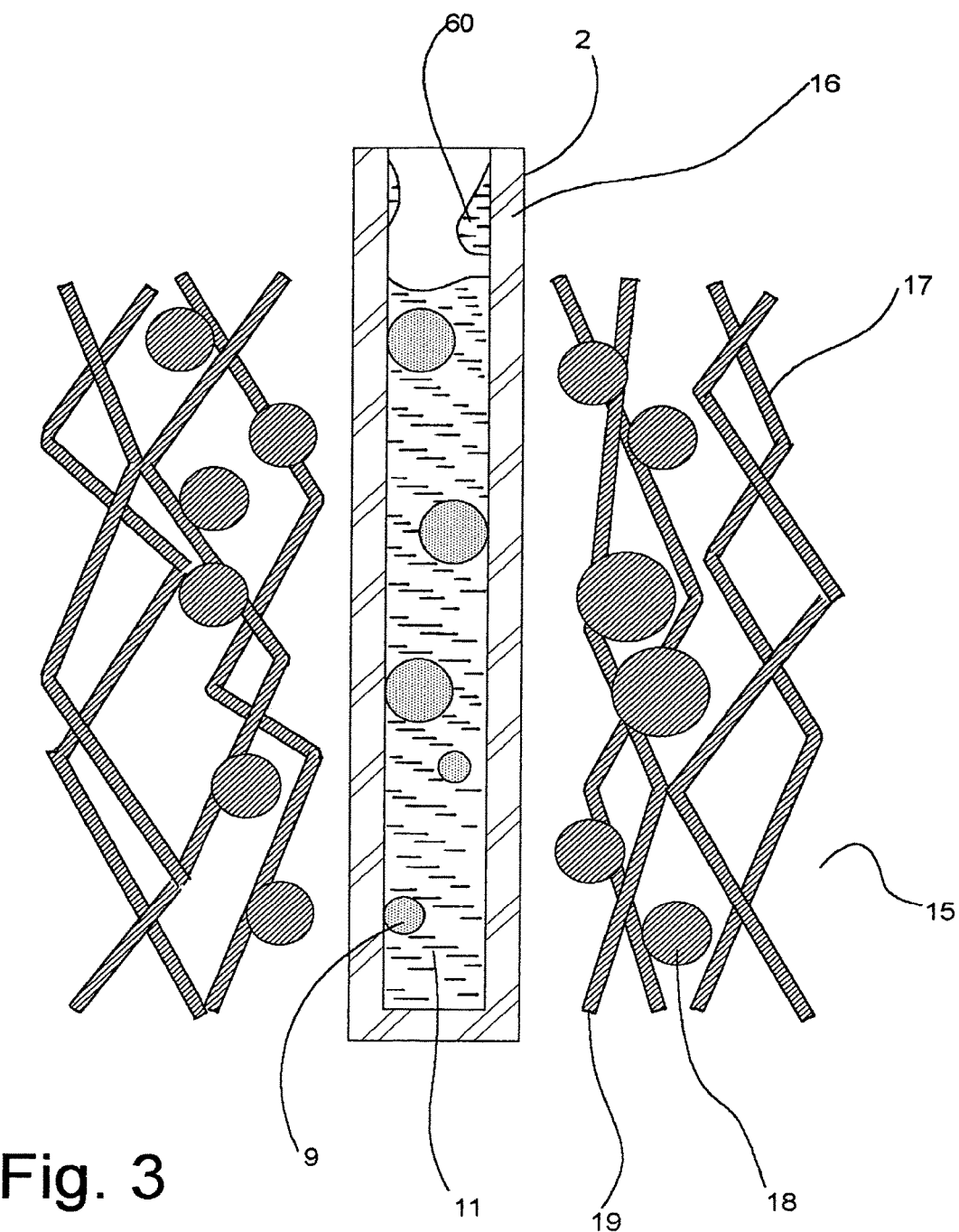
FIG. 3. Cross-sectional view of a selectively permeable tube fuel delivery and a surrounding tubular catalyst supporting nonwoven fabric.

In FIG. 3 the methanol fuel 26 is contained in a silicone rubber tube 28 lined with a polyester fiber wetting tube liner 33 made of Cool Max (Du Pont). The silicone rubber tubing 28 is surrounded by cylindrical porous felt of PBO or nonwoven fabric 31 that is coated with catalyst 30. The catalyst-coated felt tube 31 is then surrounded by an uncoated PBO nonwoven fabric 29. In operation the methanol fuel 26 diffuses through the wall of the silicone rubber tube 28 and out to the catalyst particles 30. Oxygen diffuses from the atmosphere 27 through the outer PBO nonwoven fabric 29. Heat from the catalytic combustion is conducted through the outer PBO nonwoven fabric to the surroundings. This long tube design can be a wrap around or serpentine on the surface of the application to be heated. The fuel 26 will boil 25 when the heater temperature reaches its boiling point. The vaporized fuel 25 goes up the tube and condenses 32 on the vent line 2. Condensed fuel 32 is returned to fuel in the tube by wicking into the tube liner 33.

Figure 4:
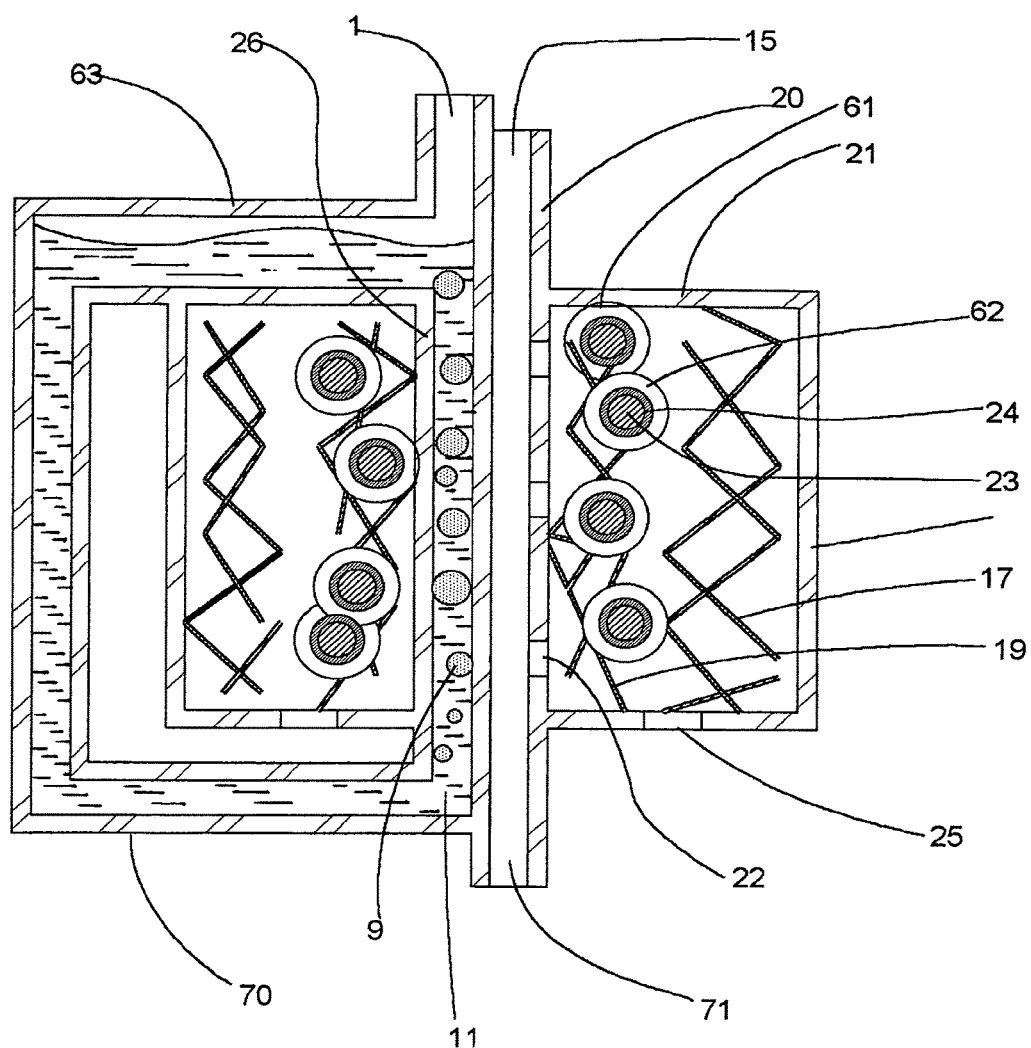
FIG. 4. Cross-sectional view of a tube fuel and air delivery to an enclosed tubular catalyst supporting felt or nonwoven fabric.

FIG. 4 shows a cross-sectional view of cylindrical tubes, where the methanol fuel 49 and the air 35 are contained in parallel tubes 36 and 38. The methanol fuel 49 is contained in one tube 36 and the air 35 is pumped through the adjacent tube 38 or tubes. The air tube 38 is made of silicone rubber or other polymers and is perforated with small pores 47 to let air 35 flow through. The fuel tube 36 is made of silicone rubber and fuel selectively diffuses out through the silicone rubber to the surrounding PBO felt or nonwoven fabric, which has been coated with catalyst particles 39. The catalyst particles 39 are supported on a porous material of zeolite, alumina or activated carbon particles 43. These are then coated with sputter deposited films of Pt/Ru or Pt. The activated carbon 43 supported catalysts 42 can also be obtained from Engelhard (Chemical Catalysts Group, 554 Engelhard Dr., Seneca, S.C. 29678). The catalyst particles 39 are air brushed onto the PBO felt tube 45. The PBO nonwoven fabric 45 with catalyst particles 39 are then wetted and coated with air brushed solid polymer electrolyte DAIS 41 in a solvent, diluted with 1-propanol (Product number). The solid polymer electrolyte 41 adheres the catalyst particles 39 to the PBO felt. Surrounding the catalyst coated PBO felt tube 45 is a second PBO felt tube 44. This second PBO felt tube 44 acts as a thermal insulator from the outer skin tube 40. Vent holes 46 placed at the end of the skin tube 40 are made of stainless steel or silicone rubber. In operation the methanol fuel 49 flows through the fuel tube 51 from a reservoir 37. The methanol fuel 49 diffuses through the silicone rubber walls of the fuel tube 36 to the catalyst particles 39. The methanol diffuses through the coating 41 on the particles to the catalytic surface 42. Air is pumped through the air tube 38 and through the vent holes in the air tube 38 and bypass exit 48. Air diffuses through the coatings 41 to the Pt/Ru catalyst 42. The methanol and oxygen combust on the Pt/Ru surfaces 42 and produce carbon dioxide and water. The carbon dioxide diffuses out through the catalyst coating 41 out to be carried away by the air flow and exit 46 or diffusing into the fuel 49 through the fuel tube wall 36. Carbon dioxide dissolved in the fuel 49 will be carried out with the flow of the fuel tube 36 to the reservoir tank 37, where it can vent out a vent hole 34 in the reservoir tank 37. Product water diffuses through the catalyst coating 41 from the catalytic surface 42 and is carried out the air vent 42 with the airflow. Due to the selective permeability of the fuel tube 26 very little product water can back diffuse into the fuel 49. This keeps the fuel pure and its diffusion rate constant through the fuel tube wall 36. The heat generated from the catalytic burn conducts from the catalyst surfaces 42, through the coating 41, through the felts 45 and 44 to the fuel and air tube and the outer skin surface 40. The heat produced can be delivered to the application either through conduction of the outer skin 40 or into the flowing fuel 49 and air 35 in the fuel 36 and air 38 tubes. The methanol fuel 49 can also boil 50 and remove heat. Alternatively heat can also be delivered by the flow of air out the bypass flow 48, the flow of exhaust gases through the vent 46, and by the condensing of fuel on the walls of the fuel reservoir 37.

Figure 5:
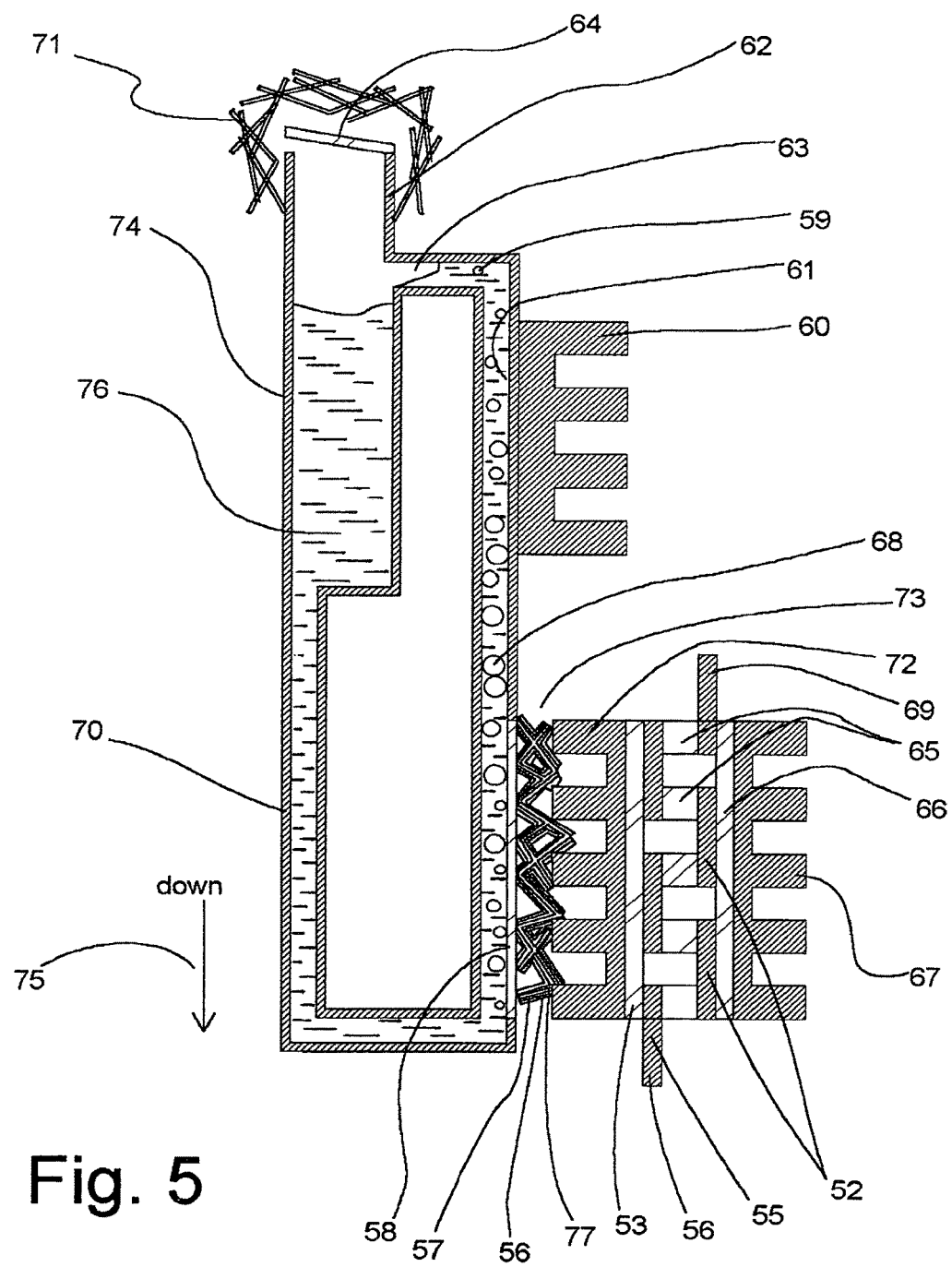
FIG. 5. Cross-sectional view of the fuel tank with membrane heater and thermopile and heat exchanger surfaces.

In FIG. 5 a system of percolation circulation with heat exchangers and a thermopile is shown. In this scheme the fuel reservoir is filled with methanol fuel 76. The fuel is fed by gravity 75 through the supply tube 70 to the bottom of the fuel membrane 58. The fuel 76 diffuses through the fuel membrane 58 to the PBO felt 77 coated with sputter deposited Pt/Ru catalyst 56, and DAIS solid polymer electrolyte 57. Oxygen diffuses from the outside air 73 through the channels of the heat exchange aluminum block 72. The resulting combustion products of carbon dioxide and water diffuse out through the channels of the aluminum block 72. Some carbon dioxide diffuses though the fuel filter 58 into the fuel. The heat produced by the catalytic combustion at the Pt/Ru 56 coated PBO felt 77 goes into the channeled aluminum block 72, through the fuel membrane 58 into the fuel 76. When the temperature of the fuel hits its boiling point the fuel boils and creates bubbles 68 in the fuel. The bubbles rise up to an aluminum heat exchanger 60. At the heat exchanger 60 the vaporized fuel 68 condenses 61 and delivers heat. The carbon dioxide bubbles 59 that are left after the fuel condenses continue with the flow 63 of fuel to the reservoir tank 74. The carbon dioxide 59 that does not stay in solution in the fuel vents through a vent valve 64 on the vent line tube 62. The methanol that is carried with the venting gas is catalytically burned by a catalyst coated felt 71 covering the outlet tube 62 and vent valve 64. The heat that travels into the channeled aluminum block 72 goes through a ceramic insulator 53 into the thermopile 54. The thermopile consists of the Peltier junctions formed by blocks of bismuth telluride alloy 54, metal conductors 52 and the output leads 55 and 69. The heat flows through the thermopile out through a second ceramic insulator 66 and to a channeled aluminum heat exchanger 67. When the catalytic heater is running the thermopile will generate electrical power in addition to being able to supply heat.

Figure 6:
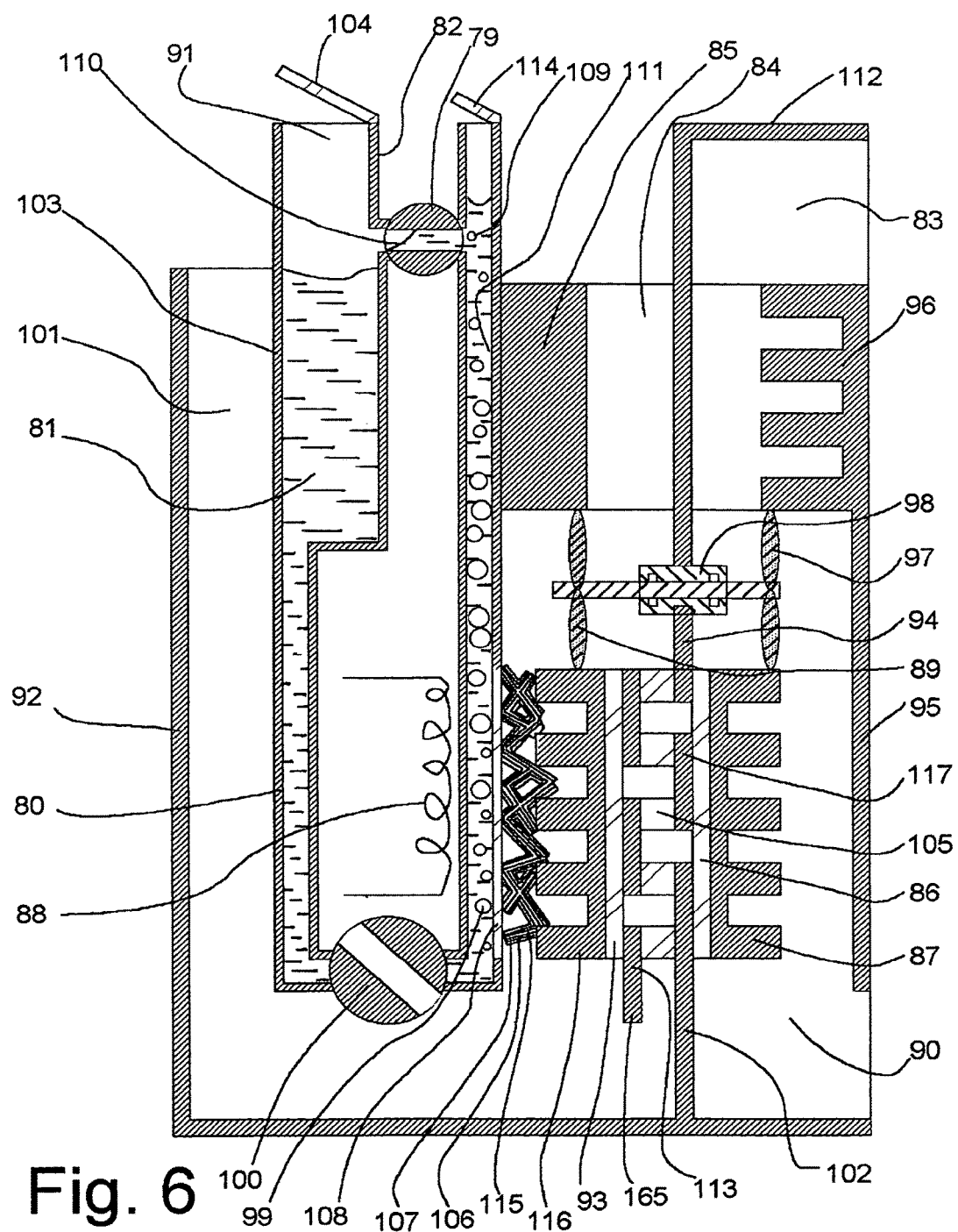
FIG. 6. Cross-sectional view of the catalytic heater system with thermopile, valves, fans, regulating electronic thermostat and gas flow channels.
Figure 7:
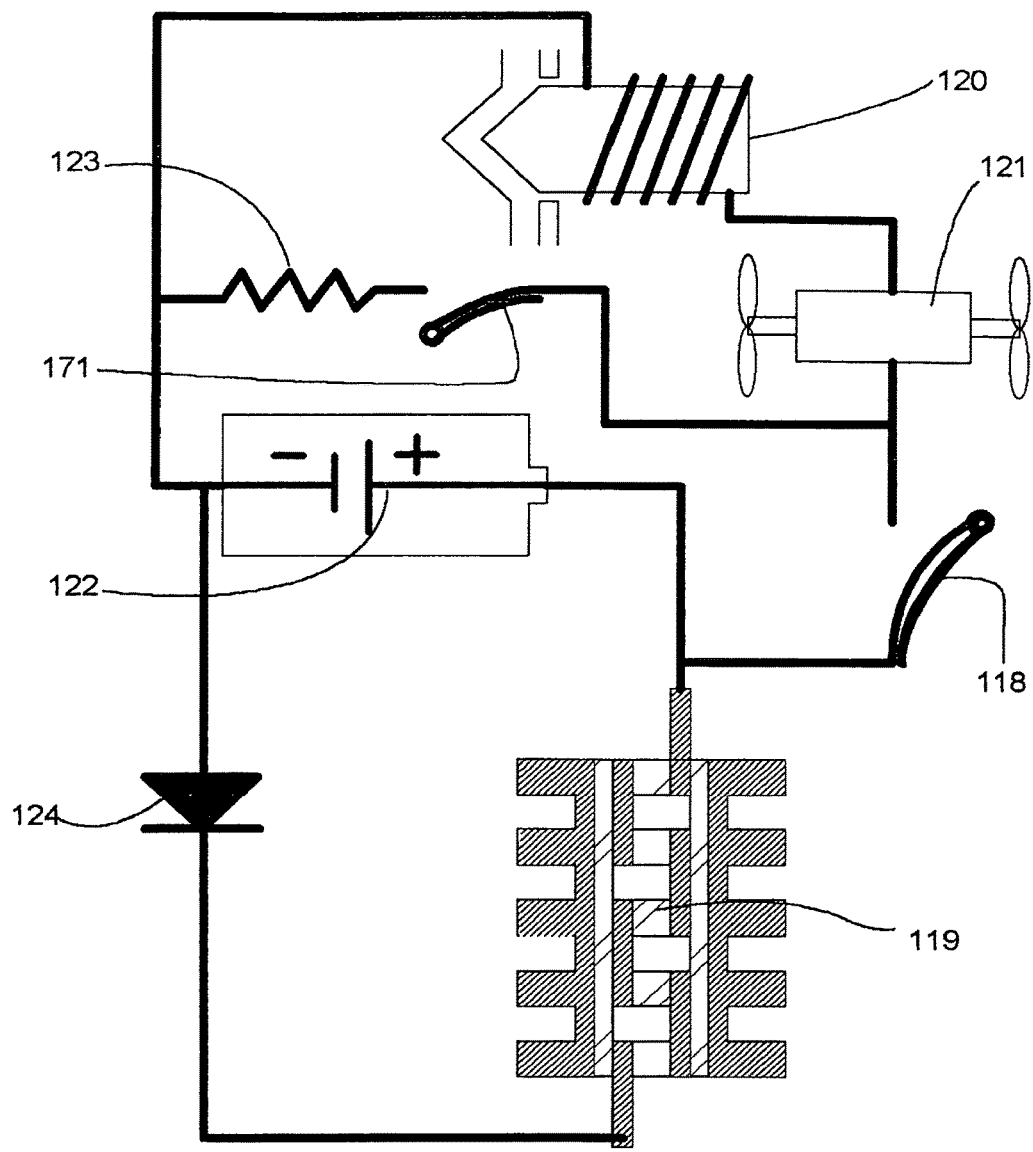
FIG. 7. Schematic representation of the electrical control system for the catalytic heater system.

In FIG. 6 the system shown uses the catalytic heater with heat exchangers, thermopile, pumped airflow, fuel control valves, and electronic controls. This figure is an illustration of an application of the catalytic heater to be an electronic thermostat-controlled flowed air heater. In this scheme the fuel reservoir is filled with methanol fuel 81. The fuel is fed by gravity through a fuel tube 80 to the bottom of the fuel membrane 108 on the fuel tube 80. A shut off valve 100 is placed near the inlet to the fuel membrane on the feed line. A second valve 79 is placed near the outlet to the fuel tank. Both valves could be electronically controlled but the most likely mode of operation is to electrically shut just the upper valve 79 and stop the airflow though the system. The lower shut off valve 100 could be a manual valve. The heater 115, 106, 107 would continue to heat but drive the fuel away from the fuel membrane 108 with vaporized fuel. This would maintain pressure/temperature equilibrium with the heater so that the heater would remain idled with very little fuel. When the temperature drops below the boiling point of the fuel, it would condense and refill the area near the fuel membrane and subsequently start the heater repeating the cycle. Closing the shutoff valve 100 would stop the flow of fuel to the heater which would continue to run until the vaporized fuel 99 and liquid fuel 110 is returned to the fuel reservoir 103 or combusted in the catalytic burner 115, 106, 107. This would shut off the heater system. Pressure relief valves 104 and 114 could be placed on the fuel reservoir vent tube 82 and on either side of the upper valve 79 to release excessive pressure and carbon dioxide gas. Relief valves 104, 114 and vents can be incorporated as spring-loaded seals in cover caps. The open pressure for these relief valves sets the boiling point of the methanol fuel or other fuels. Different fuels can be used to set the maximum external temperature of the catalytic burner. By using heat pipes in parallel with a boiling fluid and a fixed quantity of non-boiling gas the upper external temperature of the catalytic burner can also be set. To provide warmed airflow to the catalytic heater a duct 92 will be placed parallel to the outlet heat exchanger 85. Air 84 is drawn through the heat exchanger 85 by a fan 89 to be preheated before it arrives at the catalytic burner. The air goes through the catalytic burner aluminum channels 116 and then the exhaust air 101 passes back past the fuel tank 103. The exhaust air 101 cools as it passes the fuel tank 103 and water a combustion product can be condensed out of the exhaust air 101 and collected in the exhaust tube 92. On the other side of a barrier 112 cold air 90 is drawn in through ducting 95 to cool the aluminum heat exchanger 87 on the thermopile 113. The air 83 is then pumped by a fan 97 to pass out through a heat exchanger 96 and out to the application. In operation the fuel 81 diffuses through the fuel membrane 108 to the coated PBO felt 115 coated with sputter deposited Pt/Ru catalyst 106 and DAIS solid polymer electrolyte 107. Oxygen is drawn from the outside air with a fan 89 through the channels of the heat exchange aluminum block 116. The air is preheated as it flows past the fuel reservoir and the heat exchangers with the outgoing air. The resulting combustion products of carbon dioxide and water are carried with the flow out through the channels of the aluminum block 116. Some of the product water can be condensed as the exhaust air 101 is cooled and can be collected. Some of the product carbon dioxide diffuses though the fuel filter 108 into the fuel. The heat produced by the catalytic combustion at the Pt/Ru 106 coated PBO felt 115 goes into the channeled aluminum block 116 and through the fuel membrane 108 into the fuel 81. When the temperature of the fuel hits its boiling point, the fuel boils and creates bubbles in the fuel 99. The bubbles in the fuel rise up to an aluminum heat exchanger 85. At the heat exchanger the vaporized fuel condenses. and delivers heat. The carbon dioxide bubbles 109 that are left after the fuel condenses 111 continue with the flow of fuel to the reservoir tank 103. The carbon dioxide 109 that does not stay in solution in the fuel vents through a vent valve 104 on the vent line tube 82. The heat that travels into the channeled aluminum block 116 goes through a ceramic insulator 93 into the thermopile 113. The thermopile consists of Peltier junctions formed by blocks of bismuth telluride alloy 105, metal conductors 117 and the output leads 165 and 94. The heat flows through the thermopile out through a second ceramic insulator 86 and to a channeled aluminum heat exchanger 87. When the catalytic heater is running the thermopile will generate electrical power in addition to being able to supply heat. The electrical power from the thermopile can be used to run the fan motor 98, charge a battery and run the temperature control electronics for the thermostat and the electrically actuated valves. When the system is running the valves 100 and 110 will open. Fuel will flow to the fuel membrane from the reservoir and the heater will turn on and rise in temperature. In very cold conditions a resistance heater 88 using energy from the batteries 122 shown in FIG. 7 the fuel membrane 108 and catalytic felt 115, 106, 107 would be used to vaporize the fuel 81 and start the catalytic combustion. When the temperature hits the boiling point of the fuel 81 the heat transfer will be increased by vaporization and condensation. The thermopile 113 will produce sufficient power to run the fan 98 motor and recharge the batteries 122 as shown in FIG. 7. When sufficient heat is delivered to the application, the thermostat 118 shown in FIG. 7 will close the second valve 79 and the fans 89, 97 will be switched off. The vaporized fuel 99 will force the liquid fuel 81 back away from the fuel membrane 108 back to the fuel reservoir 103. The catalytic heater 115, 106, 107 will go into a lower rate of combustion with only oxygen diffusing to the heater through the inlet and outlet ducts and the fuel delivery rate reduced. A simplified version of a temperature regulated heater system could achieve temperature control by temperature regulating the second valve 79 alone. In this simplified thermostatic system gas flow circulation is by convection air flow and boiling and condensation of the fuel. The electrical system could be eliminated by using valves that are differential metal or fluid expansion valves (manufacturer). The heater devices as described can be used in a variety of applications with adaptations of components in apparel, blankets, machinery, dwellings, shipping containers, storage containers, odor generators, humidifiers, and insect attractants.

In FIG. 7 a schematic drawing of the electrical control system for the heater in FIG. 6 is shown. In this schematic the electrical output from the thermopiles 119 is fed through a diode 124 to charge a battery 122. The output of the battery 122 and the thermopile 119 is switched through a thermostat 118. The thermostat 118 is schematically represented for simplicity as a bimetallic switch. There are a large number of alternative thermostat mechanisms such as a thermistor and integrated electronic controls. When the temperature on the thermostat 118 reaches the desired set point the switch is closed and current runs the fan 121 for the catalytic heaters and the delivered airflow. An electromechanical valve 120 is opened by the current flow and lets fuel flow to the diffusion membrane 108 to feed the catalytic heater 115, 106, 107 fuel shown in FIG. 6. In this schematic FIG. 7 a second bimetallic thermostat switch 171 is shown, that can be set to close when the temperature is lower than the needed temperature to start catalytic combustion in the heater 115, 106, 107. This will divert current to a resistant coil heater 123 or catalyst electrolytic cell shown in FIG. 8. An alternative to the resistance heater is an ignition coil that repetitively sparks to ignite the fuel-air mixture over the catalyst region. This will initiate the catalytic combustion so that when the catalytic heater reaches a self sustaining temperature the bimetallic thermostat switch 171 will open, stopping the electrically assisted catalytic combustion. When the heater has delivered sufficient heat to bring the temperature to the desired set point of the load, the thermostat 171 opens the circuit turning off the fan 121. The electrically actuated valve is closed and the fuel supply to the diffusion membrane 108 is stopped. The catalytic heater 115, 106, 107 will continue to run until it has used or cleared the fuel away from the diffusion membrane 108. The thermopile 119 will continue to charge the battery 72 until the temperature of the catalytic heater drops and the voltage of the thermopile falls bellow that of the battery. The diode 124 will then prevent a discharge current flow back through the thermopile 119 from the battery 122.

Figure 8:
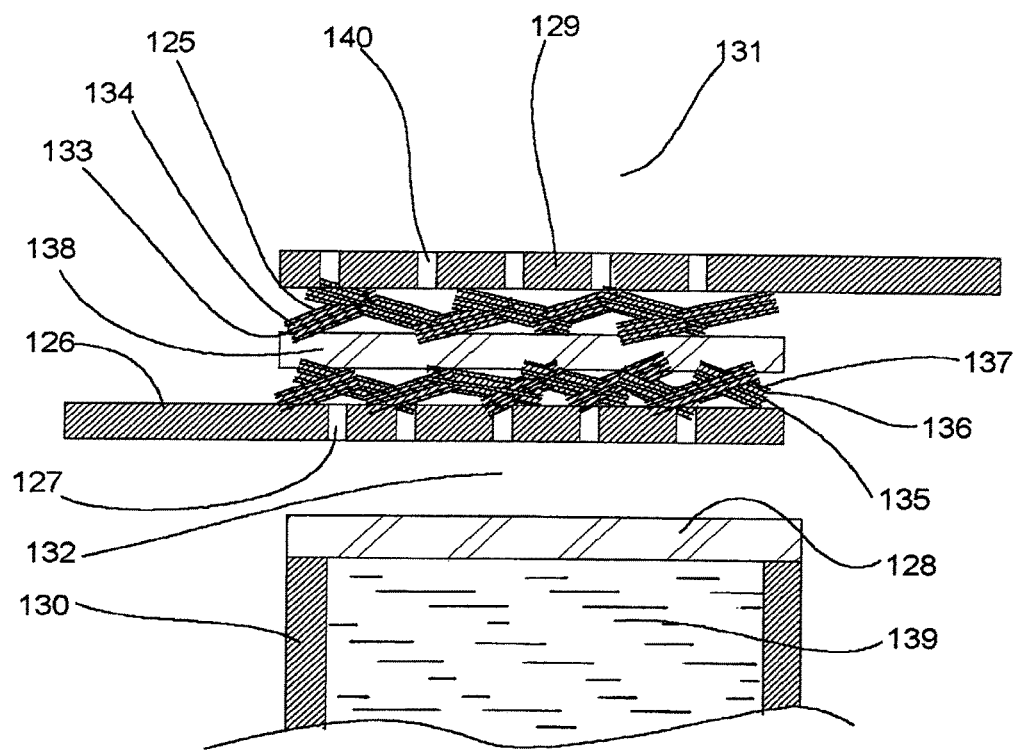
FIG. 8. Cross-sectional view of the catalytic heater electrochemical cell and diffusion fuel feed.

In FIG. 8 an electrochemical combustion cell is shown. This device consists of two electrodes 129, 126 formed by gold sputter coating PBO felt 135, 133. Gas permeability into the electrodes is provided by open pores 140 in the felts 135, 133. Pt/Ru black or sputter coated Pt/Ru 136, 134 is spray coated onto the PBO felt and a solid polymer electrolyte DAIS 137, 125 in a 1-propanol solution is spray coated over the Pt/Ru black 136, 134. A sheet of DAIS electrolyte 138 is inserted between the two electrodes 126, 129. A methanol fuel supply is provided to the cell by methanol diffusion through a selectively permeable membrane 128 and a reservoir 130 of fuel 139 in close proximity to the cell. In operation, the methanol fuel 132 and air 131 diffuse to the surface of the catalyst 136. A voltage potential is imposed across the cell through the electrodes 126, 129. Methanol and oxygen oxidize on the surface of the catalyst 136. Different applied potentials across the membrane can be used to accelerate or impede the catalytic combustion. In this way, one can obtain a fine control over the catalytic performance. On the surface of the catalyst 136, 134, protons are removed from methanol and moved through the electrolyte coating 137 through the separator electrolyte 138 and out to the second coating electrolyte 125. The proton movement through the electrolyte can also ionically drag methanol fuel through the separator electrolyte 138 increasing the delivery of fuel to be oxidized. In some situations with specific concentrations of fuel on the source side 132 and the air source side 131, the cell will run, as a fuel cell without external power needed to run current through the cell. The products of the cell are carbon dioxide and water, which diffuse out of the cell. This electrochemical combustion cell can include the following five features: First, the electrical potential on the electrodes can clean the catalysts. Second, the proton removal from the catalytic surface accelerates the catalytic performance. Third, the electrical current can heat the catalyst regions through ohmic resistance. Fourth, the electrochemical potentials on the catalysts and fuels can induce accelerated catalytic performance that is very slow at room temperatures. Fifth, the different catalytic breakdown routes can occur on the catalysts at different potentials. Thus, a wider range of fuels and fuel conditions could be handled with this mechanism compared to non-polarized catalysis.

Figure 9:
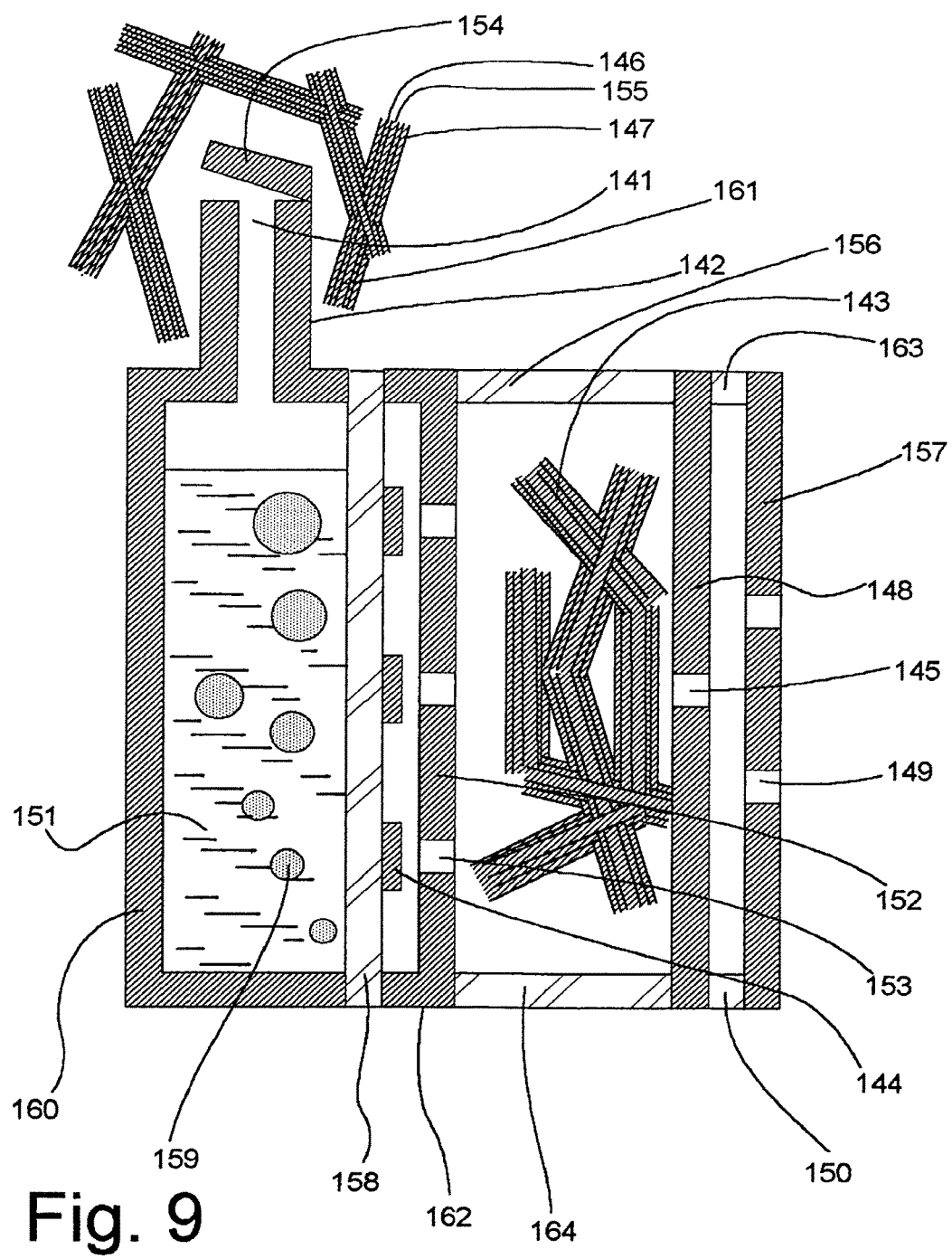
FIG. 9. Cross-sectional view of the catalytic heater with heating regulation with membrane valving.

In FIG. 9 a mechanism of using the diffusion membrane to form a pressure sensitive valve to regulate the fuel and or oxygen delivery to catalytic combustion is shown. In this arrangement of the invention the selective diffusion membrane 158 can be thickened in spots 144 or have disks of an impermeable film 144 such as aluminum glued with silicone sealant or sputter coated onto the membrane 158 that correspond to apertures 153 in a plate 152. A catalytic felt 143 is placed over the aperture plate 152. Two air diffusion plates 148, 157 made of aluminum with offset apertures 145, 149 are placed over the catalytic felt 143. The aperture plates 148, 157 are glued 164, 150 with silicone sealant along the perimeter through the catalytic felt 143 to the aperture plate 162. The diffusion plates 148, 157 are spaced apart from each other by the thickness of the glue seal 164, 150. Both the fuel diffusion rate and oxygen diffusion rate can be controlled by either flexible sealing plates or non-aligned compressible aperture plates and are show as an example of each in FIG. 9. The diffusion of oxygen between the catalytic felt 143 and the first flexible outer plate 148, on the oxygen pores 145 inlet side can be regulated by these same mechanisms as used with the fuel delivery. With the oxygen plates a second outer plate 157 and non-aligned apertures 149 or sealing apertures are used. The oxygen diffusion is reduced when the fuel membrane 158 is pressed up against the fuel aperture plate 152; the catalytic felt 143 and the outer plates 148 and 157. On the vent gas 141 outlet 142 a pressure valve or flow-limiting valve 154 is placed. A fuel tank is formed from aluminum 160. A silicone rubber fuel membrane 148 is glued with silicone sealant to the aluminum tank 160. Contained within the fuel manifold formed by the aluminum tank 160 and the silicone rubber membrane 148 is methanol fuel 151. In operation the fuel 151 is delivered by diffusion through the membrane 158. Oxygen diffuses from the atmosphere to the catalytic felt 143 through the aperture plates 157 and 148 to the catalytic felt 143 combusting the fuel and oxygen. The heat from the combustion heats the fuel tank 160, boils the fuel 159 and heats the outer plate 157. Due to diffusion of gases such as carbon dioxide and nitrogen into the fuel 151, the fuel tank 160 will pressurize. From this pressurization it bows the fuel membrane 158 and it subsequently presses it against the aperture plates 152, 148, 157 and the catalytic felt 143, sealing off the diffusion of fuel and air to the catalytic felt 143. This stops or reduces the production of heat from the catalyst combustor depending on the amount of diffusion reduction achieved by the fuel membrane 158 and the aperture plates 152, 148, 157. The combination of heat production and temperature of the heater can be regulated by the flow rate of the vent valve 154. The higher the flow rate allowed by the valve the higher the release of in-diffused gases or boiled fuel 159. The in-diffused gases are dependent upon the temperature of the fuel membrane 158, and the boiling of the fuel 151. The in-diffusion of gases and the vaporized fuel create a net source of gases in the fuel tank. By using a regulating valve 154 to vent gas 141 on the outlet tube the fuel tank pressure is regulated, the fuel delivery is regulated through the membrane contact, and subsequently the heat production is regulated. The fuel vapors 141 released by the regulating valve are combusted by a catalyst-coated sleeve 146, 155, 147 surrounding the vent line. Another mechanism of regulating catalytic combustion occurs when the fuel membrane 158 presses up against the aperture plate 152, which can also cause the aperture plate 152 to compress the catalytic felt 143 against the outer heat loss surfaces 148, 157. This reduces the insulation of the catalytic combustion felt 143, cools the catalytic combustion and reduces the reaction rates.

Figure 10:
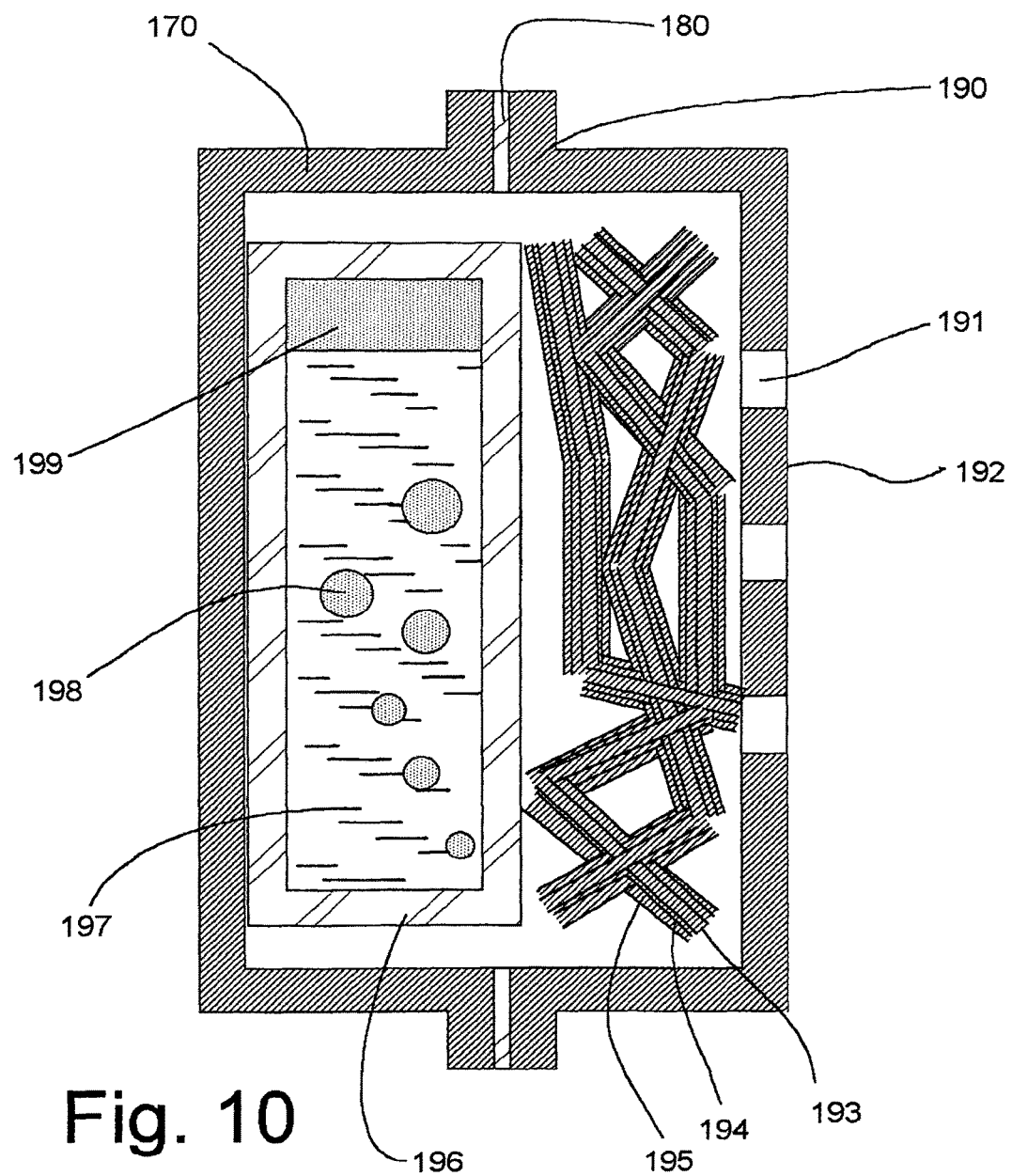
FIG. 10. Cross-sectional view of the catalytic heater configured with a selectively permeable sealed fuel ampoule.

In FIG. 10 a cross-sectional view of the catalytic heater configured with a selectively permeable sealed fuel ampoule is shown. The fueling of the catalytic heater can be done by ampoules of fuel that deliver the fuel by diffusion through the walls of the ampoule. In this configuration of the catalytic heater, fuel ampoules 196 are formed by sealing a silicone rubber cylinder or bag containing methanol fuel 197 with silicone sealant. These ampoules 196 can be stored in a methanol impermeable container shown in FIG. 11 until use. A re-sealable methanol-impermeable, thermally conductive container such as an aluminum container 170, 192 that has a seal 180 around the rim is formed. The container is sealed from the outside (not shown) prior to use. There are many possible mechanisms for the sealing of the container 170, 192 one of which is a hinge and a clasp placed around the rim 190 compressing a rim gasket 180. The aluminum container 170 has air in-diffusion holes in the container wall 191. Within the methanol-impermeable, thermally conductive container 170, 192 the fuel ampoule 196 and PBI felt 193 are contained. The catalyzed felt 193 is formed by coating Pt/Ru on carbon support catalyst powder 194, and a protective permeable coating DAIS 195, and is placed next to the air in-diffusion holes 191. In operation, the fuel ampoule 196 is placed in the container 170, 192 and clamped together. The methanol fuel diffuses to the catalyst 194 through the ampoule wall 196 and the protective catalyst coating 195, while oxygen diffuses through the holes 191 in the aluminum case 192 and the catalyst protective coating 195 to the catalyst 194. The methanol fuel and oxygen catalytically combust on the catalyst 194 and the products of water and carbon dioxide diffuse out through the protective coating, and the diffusion holes 191. Some of the carbon dioxide product can diffuse into the fuel ampoule 196. It will come to equilibrium and diffuse back out of the ampoule since it is sealed. The fuel will boil 198 when the temperature reaches its fuel boiling point. The fuel will condense 199 with subsequent heat transfer to the aluminum container 170. When the fuel ampoule pressurizes, due to boiling of the fuel 198, the ampoule 196 expands pressing against the catalytic felt 195,194,193 and pressing against the container wall 192. This increases the heat transfer rate from the catalytic felt and can reduce the air diffusion path to the catalytic felt reducing the thermal output of the catalytic heater. Thus a self heat regulation mechanism is achieved in this device.

Figure 11:
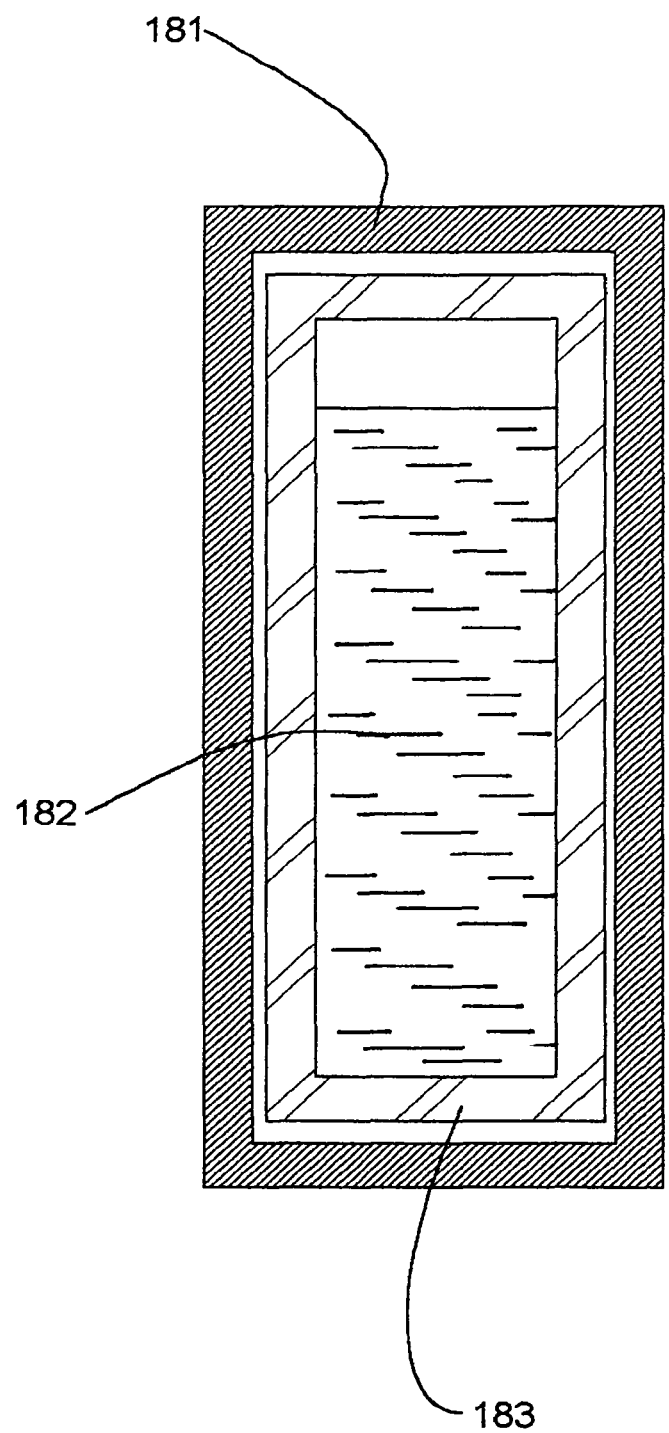
FIG. 11. Cross-sectional view of a selectively permeable fuel ampoule with a fuel impermeable container.

In FIG. 11 a cross-sectional view of a selectively permeable fuel ampoule with fuel impermeable container is shown. The fuel ampoule is formed with methanol 182 inside a silicone rubber cylinder 183 and sealed with silicone rubber sealant. The fuel ampoule is then heat sealed inside a polyethylene bag 181. The silicone rubber walls have a high permeability to methanol fuel, while the polyethylene bag has a low permeability. The outer container 181 enables the fuel ampoule 183 to be stored until needed. When the fuel ampoule is needed the polyethylene bag 181 is torn open and the ampoule 183 is placed into the heater device shown in FIG. 10. The more snug a fit to the silicone container, the more fuel can be stored and the lower the amount of dead volume within the polyethylene bag.

Figure 12:
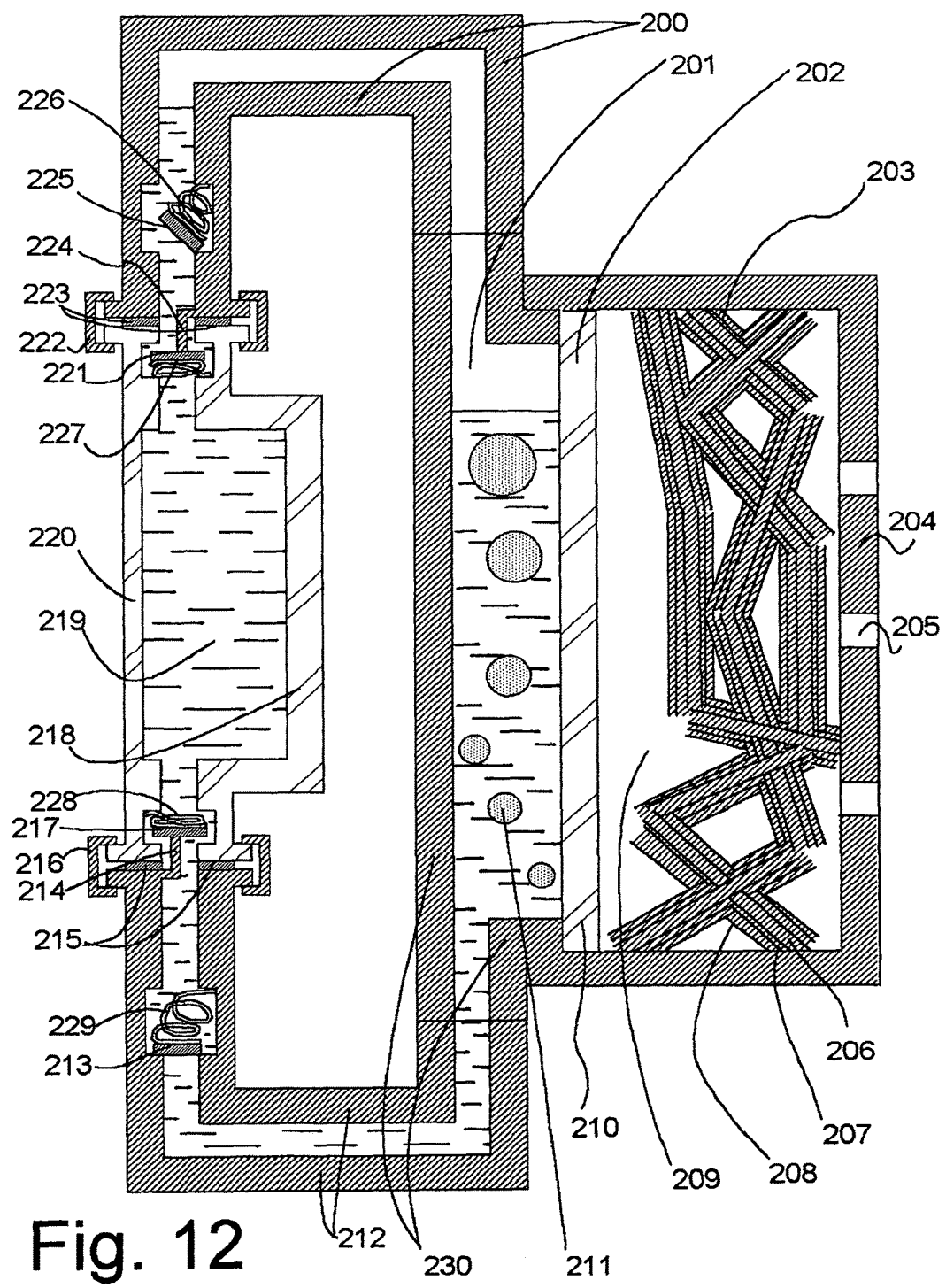
FIG. 12. Cross-sectional view of the catalytic heater configured with a pump ampoule.

In FIG. 12 a cross-sectional view of the catalytic heater configured with a pump ampoule is shown. In this configuration the heater has an elastic fuel ampoule and the fuel diffusion region is elastic or there is sufficient gas 201 in the tubing 200 to act as an elastic volume. The fuel bladder is formed by a thermoplastic rubber (Santoprene thermoplastic rubber, Advanced Elastomer Systems, 388 S. Main St., Ste 60, Akron, Ohio 44311). The fuel bladder is formed by perimeter heat sealing with a thick wall membrane 218 and a thinner walled membrane 220. The rubber is chosen to be impermeable to the methanol fuel and flexible. The fuel bladder 218 is filled with methanol fuel 219. Attached to the fuel bladder are inlet and outlet couplings that have spring loaded 227, 228 seals 221, 217. The fuel bladder 218 is coupled to the fuel hoses 200 and 212 with clamps 222, 216 or threaded couplings. The couplings 221, 217 seal to the fuel hoses 200, 212 with Viton (Quality Gasket Company, 511 Gates Street, Philadelphia, Pa. 19128) rubber seals 223, 215. The couplings are opened when hoses are clamped and the opening pins 224, 214 push the spring-loaded 228, 227 valves open. Two one-way valves 225, 213 are placed in the fuel hoses 200, 212. The closing pressure of these one-way valves 225, 213 can be set by the closing force such as a restoring spring 226, 229, and thereby set the minimum pressure needed to deliver fuel from the fuel bladder 218, 220. From the one-way valves 225, 213 a hose connects to the fuel distribution bladder or capillary hoses 210. The fuel distribution bladder is made of capillary tubes of silicone rubber 210, 230 with wall thickness of 0.5 mm to 0.025 mm thick (SiO flex tubing, Specialty Silicone Fabricators, 3077 Rollie Gates Drive, Paso Robles, Calif. 93446). Alternatively a silicone bladder 230 is made with a wall thickness ranging from 0.5 mm to 0.025 mm thick polyester reinforced silicone membrane 210 (Vulcanized Sheeting, Specialty Silicone Fabricators). A return fuel flow line 212 is connected between the fuel distribution bladder 210, 230 back to the second one way valve 213. The fuel distribution bladder 210, 230 is placed in close proximity to the catalytic heating felt formed by coating a PBO felt 206 with Pt/Ru black 207 and overcoated with DAIS polymer electrolyte 208. The catalytic felt 203 and the fuel distribution bladder 210, 230 are glued together with silicone rubber sealant to form a combustion volume 209 within an aluminum or silicone rubber box 204. Air diffusion holes 205 perforate the aluminum box 204. In operation the fuel tank is connected to the heater system by making the two connections 215, 223. The fuel tanks can be pre-filled ampoules with the pin connection that bursts and/or opens the seals in the fuel connections. By pressing a finger on the fuel diaphragm 220 the fuel bladder 218 is pressurized and fuel 219 flows through the first coupling 221, the first one way valve 225 and through the tube 200 to the fuel distribution bladder or capillary tube 230. The second one way valve 213 is closed to flow back toward the fuel distribution bladder 230. The opening spring 226, 229 force on the one-way valves 225, 213 is set high enough to keep the valves closed to avoid gravitational hydraulic pressure causing a siphoning and the fuel to flow freely. When the finger pressure is relieved from the tank diaphragm 220 the first one-way valve 225 is closed and the second valve 213 opens when the pressure is low in the fuel bladder 218. This draws fuel 219 and fuel vapor 211 out of the fuel distribution bladder 230. When the methanol fuel 219 is in the distribution bladder 230 the fuel diffuses out through the membrane 202 to catalyst felt volume 209. The methanol fuel 219 diffuses to the surface of the catalyst coating 208 and through to the catalyst surfaces 207. Oxygen simultaneously is diffusing through the air inlet holes 205, into the catalyst-felt volume 209 and through the catalyst coating 208 to the catalyst 207. The oxygen and methanol fuel catalytically combusts on the surface of the catalyst 207. The products of water and carbon dioxide diffuse back through the catalyst surface coating 208, into the catalyst felt volume and out through the air inlet holes 205. When the catalytic combustion delivers sufficient heat energy to cause the fuel to boil the fuel distribution bladder 210, 230 pressurizes. This pressurization causes the second one-way valve 213 to open and the methanol vapor 211 and liquid 219 flows into the fuel bladder 218. The methanol vapor will condense in the fuel bladder 218. The pressurization of the fuel distribution bladder from vaporized fuel and in diffusion of gasses due to the boiling of the fuel also results in the diffusion membrane 210 bulging and compressing the catalytic felt 203 against the container wall 204. This increases the thermal conductivity from the catalytic sites 207 to the outside air and cooling the catalyst 207. By compressing the catalytic felt 203 against the wall, the space available for diffusion of oxygen also decreases and the oxygen diffusion to the catalytic sites 203 is reduced, thereby reducing the rate of catalytic combustion. The catalytic sites cool and the methanol fuel 211 cools thereby giving this catalytic combustion system temperature feedback control. The pumping of fuel can be used as a feature in applications, such as in apparel where the user presses the fuel tank bladder 220 to receive a pulse of heat. This allows the user to control the time and amount of heating.

Essential Features:
1. Fuel delivered though a selectively permeable membrane.
2. The selectively permeable membrane allows fuel to be delivered and not back diluted by the product water.
3. A selectively permeable membrane to allow oxygen and with a reduced permeability to fuel to retain fuel.
4. The carbon dioxide and other gasses diffuse into the membrane and vent and circulate through the fuel with the fuel boiling.
5. A catalyst dispersed over a porous material.
6. A fuel and oxidizer permeable protective coating over the catalyst.
7. A selectively permeable coating over the catalyst.
8. A fuel retaining coating over the catalyst.
9. A coating over the catalyst that enhances the performance of the catalyst.
10. A coating over the catalyst that is electrolytic and or acidic or basic.
11. The fuel vaporization and departure from the membrane to catalyst reaction area to act as a thermostat of upper temperature limit mechanism.
12. Valving or flow restrictions to regulate the boiling or fuel filling to regulate temperature of heating rates.
13. Using fuel additives such as water or other hydrocarbon fuel with different boiling points to adjust the catalytic burner temperatures.
14. Using the fuel vaporization and condensation as a heat pipe heat exchanger.
15. The onset of boiling of the fuel to keep the reaction area temperature elevated.
16. To incorporate thermopiles to extract electrical energy from the heater and transfer heat.
17. To use heat exchangers to warm up air going to the heater and exchange heat with the load.
18. Extracting water from the condensation of the exhaust from the heater.
19. Use a selectively permeable membrane to regulate the oxidizer to the catalyst reaction area.
20. Use of stoma devices to thermally regulate the oxidizer gas to the catalyst area.
21. Use of fans or pumps to regulate the fuel or oxidizer delivery to the catalyst area or heat exchange.
22. The use of electrochemical catalysis to enhance the performance.
23. Use of electric heating to start the catalytic heater.
24. Use of passive mechanical controls and pressurization of the fuel to control the heat output.
25. Use of a wick to distribute fuel over the selectively permeable membranes.
26. Use of the heater on many systems, apparel, blankets, machinery, dwellings, shipping containers, storage containers insect attractants, humidifiers, and perfume generators.

While the invention has been described with reference to specific embodiments, modifications and variations of the invention may be constructed without departing from the scope of the invention, which is defined in the following claims.

What is claimed is:

1. A heat-generating device comprising
   a. a fuel source;
   b. a fuel delivery connected to the fuel source;
   c. a catalyst dispersed over a porous substrate; wherein the catalyst is in diffusive contact with an oxidizing gas;
   d. a first molecular selectively permeable membrane for selective molecular delivery of fuel by diffusion from the fuel source to the catalyst, wherein the first molecular selectively permeable membrane only allows gasses and fuel vapors to diffuse through the membrane to the catalyst;
   e. one or more heat exchangers configured for transferring heat from the catalytic reaction site to the fuel or the oxidizing gas or both;
   f. a second selectively permeable membrane, wherein the second selectively permeable membrane is fuel and oxidizer permeable and regulates delivery of oxidizing gas to the catalyst, wherein the oxidizing gas moves to the catalyst through the second selectively permeable membrane by diffusion; and
   g. wherein the device further comprising an upper temperature limit setting on a thermal output caused by boiling the fuel.

2. The device of claim 1, wherein by containing the fuel behind the first molecular selectively permeable membrane and using only diffusion to deliver the fuel, the rate of delivery of fuel vapor to the catalyst is dependent upon the concentration of liquid in contact with the fuel membrane rather than the fuel vapor pressure.

3. The device of claim 1, wherein the selective permeability of the first selectively permeable membrane to fuels over water produced by combustion at the catalyst keeps the liquid fuel reservoir from being contaminated with the water and maintains the fuel concentration and a steady rate of fuel delivery.

4. The device of claim 1, further comprising an additional fuel and oxidizer permeable protective coating that protects the combustion catalyst from contamination and retains fuel at the catalyst.

5. The device of claim 1, wherein the vaporized fuel can be condensed in the one or more heat exchanger and deliver the thermal output of the heater efficiently.

6. The device of claim 1, wherein fuel vaporization and departure from the first selectively permeable membrane to catalyst reaction area act as a thermostat and thereby creates an upper temperature limit mechanism.

7. The device of claim 1, wherein a maximum pressure of the fuel reservoir is selected to set the boiling point of the fuel and therefore set the maximum temperature of the heater.

8. The device of claim 1, wherein fuel boiling in combination with back diffusion of carbon dioxide and nitrogen through the first selectively permeable membrane can also be used to keep the fuel homogeneous and self-purging.

9. The device of claim 1, wherein the catalytic heater is insensitive to orientation.

10. The device of claim 1, wherein a steady delivery of liquid fuel or gas fuel is needed to maintain contact with the selectively permeable membrane.

11. The device of claim 1, wherein bubbles and gas pockets in the fuel will not significantly affect the diffusion of fuel through the selectively permeable membrane as long as the surface of the membrane is wetted by fuel.

12. The device of claim 1, wherein wet coating or wicking material could be used to spread liquid fuel uniformly over the surface of the selectively permeable membranes.

13. The device of claim 1, wherein increasing the hydraulic pressure will not significantly increase the concentration of a liquid fuel against the first selectively permeable membrane.

14. The device of claim 1, wherein the diffusion rate of fuel will not be changed if the system is inverted causing a low or high hydraulic pressure on the first selectively permeable membrane.

15. The device of claim 1, wherein the first selectively permeable membrane is a silicone rubber membrane.

16. The device of claim 1, wherein the second selectively permeable membrane comprises silicone rubber or a solid polymer electrolyte.

17. The device of claim 1, wherein catalyst layer is over-coated with a thin protective coating, such as a solid polymer electrolyte or silicone rubber.

18. The device of claim 1, wherein second selectively permeable membrane has a high solubility and affinity for the fuel and water so it increases the concentration of the fuel on the catalyst.

19. The device of claim 1, wherein the second selectively permeable membrane also has limited permeability to fuel and oxygen, which limits the rates of catalytic combustion on the catalyst surface and keeps the catalyst from going into high temperature or flame combustion.

20. The device of claim 1, wherein the second selectively permeable membrane has a permeability that changes with temperature to act as a fuel and oxidizer moderator.

21. The device of claim 1, wherein the selective permeability of the first selectively permeable membrane prevents water from diluting the fuel and reducing the fuel delivery rate.

22. The device of claim 1, wherein the selective diffusion through membranes is dominated by the concentration gradient across them and its permeability at particular temperatures.

23. The device of claim 1, wherein the fuel delivery is independent of the vapor pressure of the fuel when the first selectively permeable membrane is immersed in fuel.

24. The device of claim 1, further comprising an oxygen membrane comprising a porous material or mechanical filter mechanism for diffusion of oxygen from a source of oxygen to the surface of the catalyst to react with the fuel on the catalyst.

25. The device of claim 1, wherein the oxygen membrane can also be a material or mechanical mechanism that increases or decreases its rate of oxygen diffusion depending on temperature, thus limiting the catalytic combustion.

26. The device of claim 1, wherein carbon dioxide and other gasses diffuse into the first permeable membrane and vent and circulate through the fuel with the fuel boiling.

27. The device of claim 1, wherein gravity is used to separate fuel, gases, and vapor and circulate fuel.

28. The device of claim 1, further comprising stoma for thermally regulating the air or oxidant to the reaction area.

29. The device of claim 1, wherein the fuel is a liquid fuel, and wherein the fuel is removed from a catalytic reaction area by boiling.

30. The device of claim 1, further comprising valves, flow restrictions, or pressure reliefs for regulating a boiling temperature of the fuel.

31. The device of claim 1, further comprising regulation of fuel delivery rate with self-pressurization of the fuel.

32. The device of claim 1, wherein the first selectively permeable membrane is selectively permeable to gases and fuel boiling in the device and wherein the membrane uses the selective permeability to aspirate, circulate, or prevent motion of the fuel.

33. The device of claim 1, wherein the selectively permeable membranes change diffusion rates with temperature changes for regulating temperature of the device.

* * * * *